US012583744B2

(12) United States Patent
Swenson

(10) Patent No.: US 12,583,744 B2
(45) Date of Patent: Mar. 24, 2026

(54) DIRECT COUPLED ATMOSPHERIC CARBON REDUCTION DEVICE WITH HYDROGEN UTILIZATION

(71) Applicant: Roger Swenson, Salt Lake City, UT (US)

(72) Inventor: Roger Swenson, Salt Lake City, UT (US)

( * ) Notice: Subject to any disclaimer, the term of this patent is extended or adjusted under 35 U.S.C. 154(b) by 1193 days.

(21) Appl. No.: 17/214,704

(22) Filed: Mar. 26, 2021

(65) Prior Publication Data

US 2022/0306466 A1     Sep. 29, 2022

(51) Int. Cl.
*C01B 3/40* (2006.01)
*B01J 23/745* (2006.01)
*B01J 23/75* (2006.01)
*C10J 3/20* (2006.01)
*C10J 3/72* (2006.01)

(52) U.S. Cl.
CPC ............... *C01B 3/40* (2013.01); *B01J 23/745* (2013.01); *B01J 23/75* (2013.01); *C10J 3/20* (2013.01); *C10J 3/723* (2013.01); *C01B 2203/0283* (2013.01); *C01B 2203/0415* (2013.01); *C01B 2203/0475* (2013.01); *C01B 2203/0485* (2013.01); *C01B 2203/062* (2013.01); *C01B 2203/1205* (2013.01); *C01B 2203/1614* (2013.01); *C01B 2203/86* (2013.01); *C10J 2200/06* (2013.01); *C10J 2200/15* (2013.01); *C10J 2300/0916* (2013.01); *C10J 2300/0979* (2013.01); *C10J 2300/0986* (2013.01); *C10J 2300/1612* (2013.01); *C10J 2300/1621* (2013.01); *C10J 2300/1693* (2013.01)

(58) Field of Classification Search
None
See application file for complete search history.

(56) References Cited

PUBLICATIONS

Kumar et al., From biomass to syngas, fuels and chemicals—A Review, AIP Conf. Proc., 2020 (Year: 2020).*
Fagernas et al., Drying of biomass for second generation synfuel production, Biomass and Bioenergy, 2010 (Year: 2010).*
Zhang et al., Biofuel manufacturing from woody biomass: Effects of sieve size used in biomass size reduction, Journal of Biomedicine and Biotechnology, 2012 (Year: 2012).*
Dinca et al., CO2 capture from syngas generated by a biomass gasification power plant with chemical absorption process, Energy, 2018 (Year: 2018).*
Svensson et al., Transportation systems for CO2-application to carbon capture and storage, Energy Conversion and Management, 2004 (Year: 2004).*
Zhu et al., Resolving the reaction mechanism for H2 formation from high temperature water-gas shift by chromium-iron oxide catalysts, ACS Catal., 2016 (Year: 2016).*

(Continued)

*Primary Examiner* — Keling Zhang
(74) *Attorney, Agent, or Firm* — Steven Rinehart

(57) ABSTRACT

Combining multiple subsystems involving biomass processing, biomass gasification of the processed biomass where a synthesis gas is produced then converted to hydrogen fuels or other transportation fuels for use in coupled transportation systems sized to consume all the transportation fuel produced. Carbon in the biomass is converted to $CO_2$ in the conversion process and a portion of that $CO_2$ is captured and sequestrated for long term storage.

16 Claims, 14 Drawing Sheets

(56) References Cited

PUBLICATIONS

Saw et al., Simulation and control of water-gas shift packed bed reactor with inter-stage cooling, IOP Conf. Series: Materials Science and Engineering, 2016 (Year: 2016).*

Abdoulmoumine et al., A review on biomass gasification syngas clean up, Applied Energy, 2015 (Year: 2015).*

Woolcock, A review of cleaning technologies for biomass-derived syngas, Biomass and Bioenergy, 2013 (Year: 2013).*

Dehue et al., Toward a harmonized sustainable biomass certification scheme, WWF International, 2007 (Year: 2007).*

NationalGride, https://www.nationalgrid.com/stories/energy-explained/what-is-renewable-natural-gas-rng#:~:text=There%20are%20two%20main%20methods,a%20reactor%20called%20a%20gasifier (Year: 2024).*

Zhu et al., Two-train elevated-temperature pressure swing adsorption for high-purity hydrogen production, Applied Energy, 2018 (Year: 2018).*

* cited by examiner

400

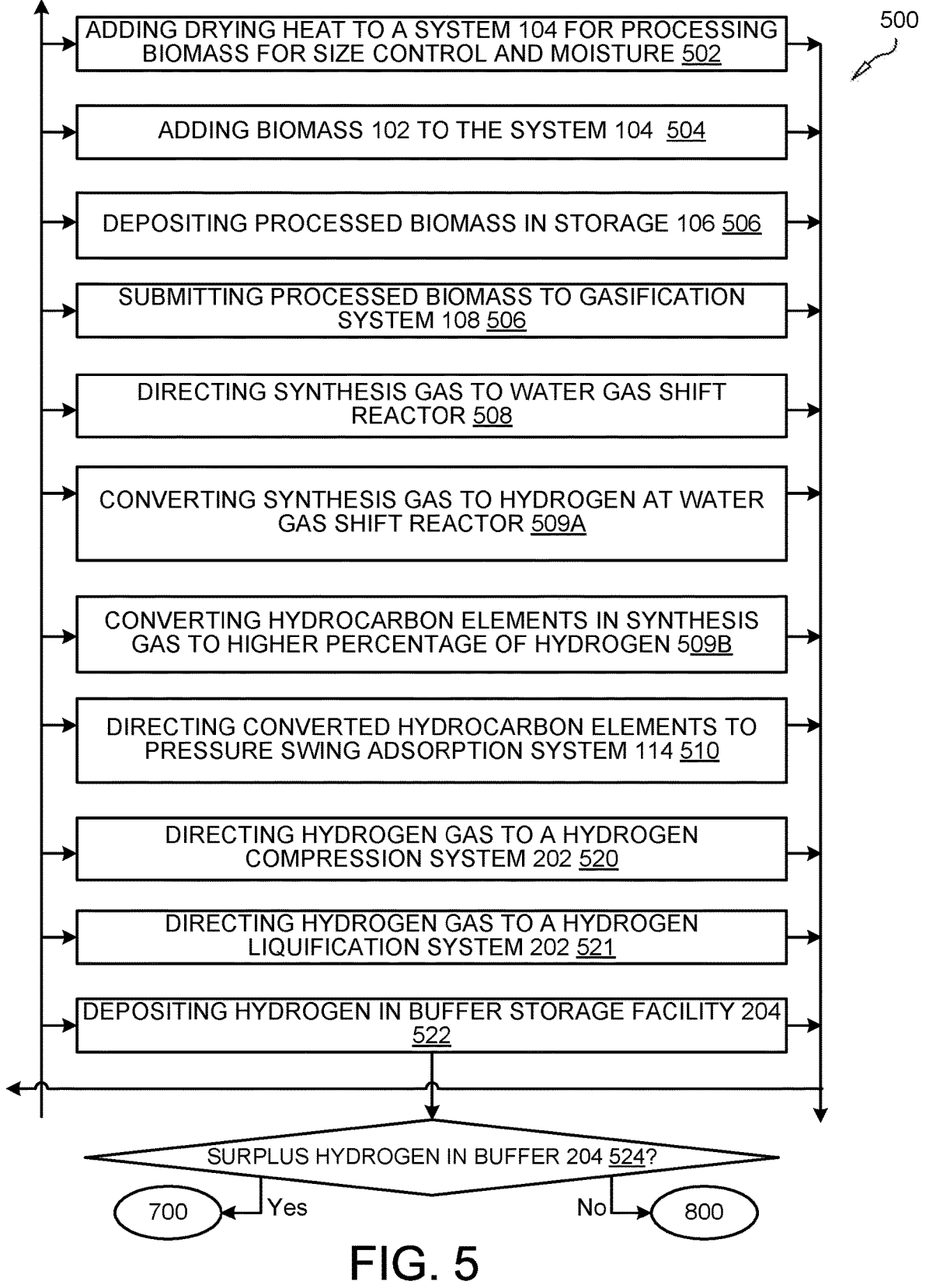

500

ADDING DRYING HEAT TO A SYSTEM 104 FOR PROCESSING BIOMASS FOR SIZE CONTROL AND MOISTURE 502

ADDING BIOMASS 102 TO THE SYSTEM 104  504

DEPOSITING PROCESSED BIOMASS IN STORAGE 106 506

SUBMITTING PROCESSED BIOMASS TO GASIFICATION SYSTEM 108 506

DIRECTING SYNTHESIS GAS TO WATER GAS SHIFT REACTOR 508

CONVERTING SYNTHESIS GAS TO HYDROGEN AT WATER GAS SHIFT REACTOR 509A

CONVERTING HYDROCARBON ELEMENTS IN SYNTHESIS GAS TO HIGHER PERCENTAGE OF HYDROGEN 509B

DIRECTING CONVERTED HYDROCARBON ELEMENTS TO PRESSURE SWING ADSORPTION SYSTEM 114 510

DIRECTING HYDROGEN GAS TO A HYDROGEN COMPRESSION SYSTEM 202 520

DIRECTING HYDROGEN GAS TO A HYDROGEN LIQUIFICATION SYSTEM 202 521

DEPOSITING HYDROGEN IN BUFFER STORAGE FACILITY 204 522

SURPLUS HYDROGEN IN BUFFER 204 524?

700          Yes          No          800

FIG. 5

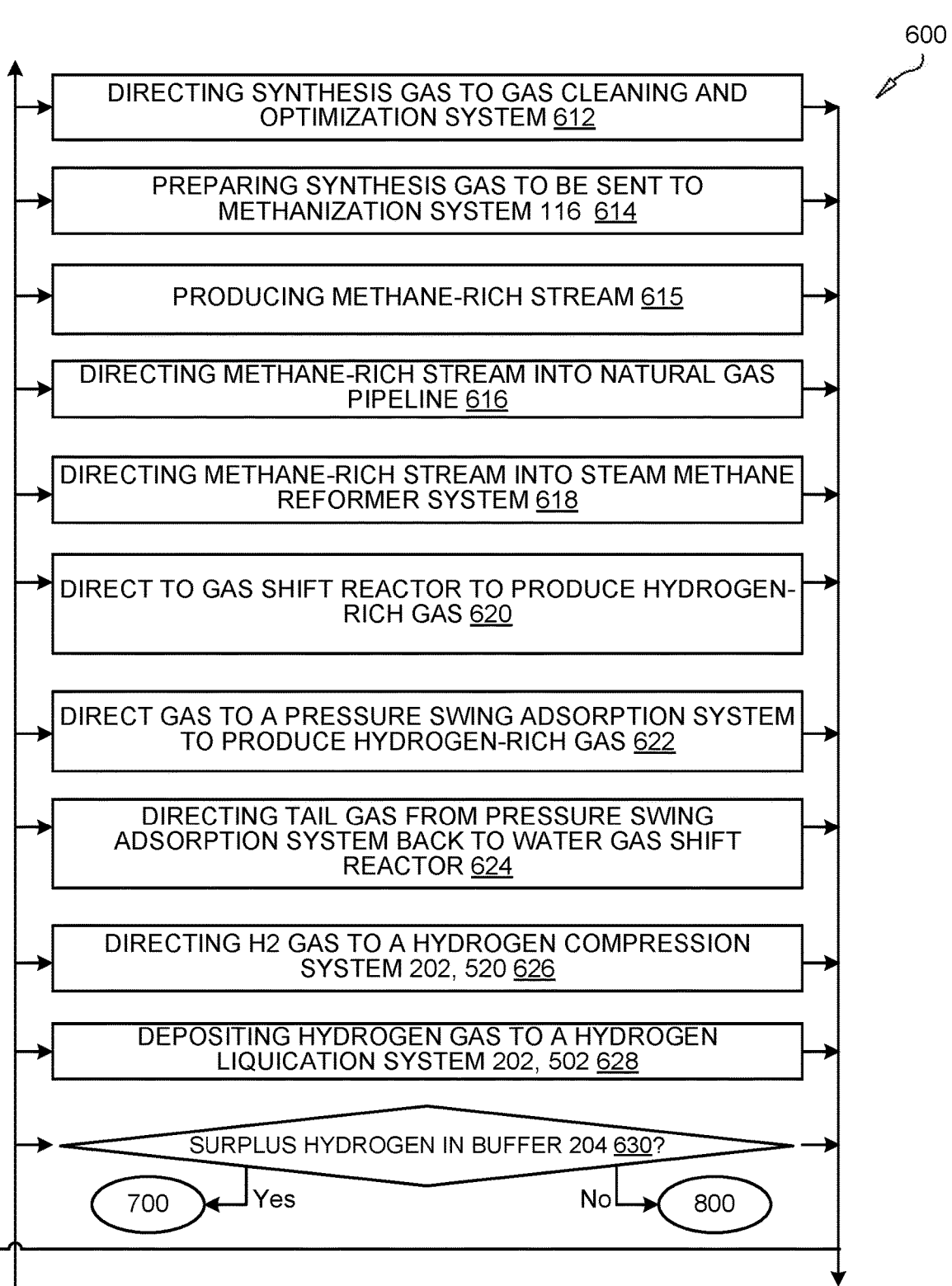

600

DIRECTING SYNTHESIS GAS TO GAS CLEANING AND OPTIMIZATION SYSTEM 612

PREPARING SYNTHESIS GAS TO BE SENT TO METHANIZATION SYSTEM 116 614

PRODUCING METHANE-RICH STREAM 615

DIRECTING METHANE-RICH STREAM INTO NATURAL GAS PIPELINE 616

DIRECTING METHANE-RICH STREAM INTO STEAM METHANE REFORMER SYSTEM 618

DIRECT TO GAS SHIFT REACTOR TO PRODUCE HYDROGEN-RICH GAS 620

DIRECT GAS TO A PRESSURE SWING ADSORPTION SYSTEM TO PRODUCE HYDROGEN-RICH GAS 622

DIRECTING TAIL GAS FROM PRESSURE SWING ADSORPTION SYSTEM BACK TO WATER GAS SHIFT REACTOR 624

DIRECTING H2 GAS TO A HYDROGEN COMPRESSION SYSTEM 202, 520 626

DEPOSITING HYDROGEN GAS TO A HYDROGEN LIQUICATION SYSTEM 202, 502 628

SURPLUS HYDROGEN IN BUFFER 204 630?

700        Yes              No        800

Unprocessed biomass 8

Screen 902

Processed biomass 9

1300

1400

DIRECT COUPLED ATMOSPHERIC CARBON REDUCTION DEVICE WITH HYDROGEN UTILIZATION

BACKGROUND OF THE INVENTION

Field of the Invention

The present invention relates generally to the field of carbon capture with renewable energy conversion systems. More specifically this invention deals with converting biomass to a useful product hydrogen by using a gasification conversion system producing hydrogen with carbon dioxide capture with sequestration and directing the hydrogen produced into a specialized transportation fuel delivery and use system created to match hydrogen output directly.

Description of the Related Art

Historically residual biomass use as a fuel has generally been done with direct combustion of biomass to produce heat that is used to produce steam to drive a steam turbine system for power generation. Such systems generally produce power with an efficiency that uses only 20%-25% of the energy available in the biomass. Such systems are generally located in areas where the biomass is readily available such as near lumber mills or other forested areas with substantial biomass availability.

In recent years other systems for converting biomass to usable fuels have been developed such as gasification and pyrolysis-based systems. Gasification systems utilizing biomass in the form of woody residues or municipal waste including bio-solids are available that produce a synthesis gas for use in producing various products at the gasification site. Those products include renewable power from such gas, various gaseous chemicals including methane, liquid fuels such as diesel and gasoline components or even hydrogen alone as a product.

Transportation fuels have been identified as a critical contributor to greenhouse gases that have been increasing and causing negative effects with carbon additions to the atmosphere. Biobased fuels can be used as a transportation fuel to provide lower carbon additions to atmospheric balances of $CO_2$ given the photosynthetic carbon cycle that they are derived from. That carbon cycle from biofuels can be made to extract $CO_2$ from the atmosphere if in the process of creating a biofuel product some portion of carbon is extracted from the process and captured in some form and sequestered in long term storage sites. Biomass gasification with the production of hydrogen provides the greatest amount of carbon from the bio-based cycle for capture to storage sites since the product hydrogen, has no carbon remaining. However, the complicated nature of the hydrogen logistics supply chain and specialized utilization systems has made it difficult to deploy hydrogen as a useful product to be used to a substantial degree in transportation.

Now gasification systems have been engineered at various scales are now available at commercial technology ready levels. Hydrogen production systems from biomass gasification syngas are at commercial technology readiness levels with proven systems. Distribution systems for both liquid and compressed hydrogen are commercially available. Fuel cell electric vehicles (FCEVs) and fuel cell electric trucks (FCETs) are transportation vehicles are now designed and are in small scale production and are looking for mechanisms to reach mass production levels.

The circumstance of a lack of distribution systems with a meaningful supply of hydrogen has been described as a limiting factor in the development and adoption of transportation systems using hydrogen in vehicles such as FCEVs. The lack of operating vehicles that can use hydrogen like FCEVs has been called out as a reason that the distribution systems have not been developed since the economics of installing the production and distribution systems depend on meaningful usage from delivery points. This invention overcomes those constraint issues by bringing the production of hydrogen together simultaneously with a distribution system and a matching use system directly coupled together at the same time.

SUMMARY

From the foregoing discussion, it should be apparent that a need exists for a direct coupled atmospheric carbon reduction device with hydrogen utilization. The present invention has been developed in response to the present state of the art, and in particular, in response to the problems and needs in the art that have not yet been fully solved by currently available inventions. Accordingly, the present invention has been developed to provide a mechanism that utilizes carbonaceous materials derived from compounds formed from atmospheric carbon dioxide that has been transformed into biomass material and then transforming that carbonaceous material into hydrogen along with carbon dioxide where the carbon dioxide is captured and sequestered in long term storage and the hydrogen is used in transportation systems as a fuel.

A method of converting biomass into hydrogen is provided, the steps of the method comprising: creating processed biomass by: adding drying heat to a system configured to reduce moisture of unprocessed biomass to 17% or less by weight; filtering out particulates from the unprocessed biomass which exceed a predetermined diameter threshold using one or more of: a screen, diverter gate, and disc screener, wherein the unprocessed biomass has a moisture content of 30% to 45% by weight; depositing processed biomass in storage; submitting the processed biomass to a gasification process to create a syngas in which: a portion of the processed biomass is converted to carbon dioxide that is captured and sequestered in a storage tank; and hydrogen is produced, captured and directed into a transportation fuel use. The storage tank may be an underground geologic formation.

Ninety-five percent of the processed biomass may be between 2 mm and 80 mm in diameter. In various embodiments, the steps of the method further comprise moving the unprocessed biomass on a moving conveyor belt during the drying step.

The method may further comprise using a plurality of fixed bed reactors in two to five stages to gradually lower outlet temperatures of the processed biomass.

The method may also further comprise subjecting the biomass during gasification to a reaction involving FE-CR-based catalysts.

In various embodiments, the gas inlet temperatures are between 350 degrees and 550 degrees Celsius.

The method may further comprise: submitting compressed syngas to a reactor system in which carbon monoxide in converted into carbon dioxide and water in the presence of steam over a Cobalt/Molybdenum catalyst, removing H2S using an acid gas removal unit; converting carbon monoxide, carbon dioxide and hydrogen into CH4 using a two-pass methanation reactor.

In some embodiments, the method further comprises: separating carbon dioxide from a tail gas stream using an amine stripping system; and feeding carbon dioxide gas to an adsorber to react with amine to create a rich amine solution; sending the rich amine solution to a stripper system to desorb the carbon dioxide with heat; releasing and capturing the carbon dioxide into a collection system; cooling desorbed amine and sending it back to adsorber to cycle.

The amine system may remove up to 99.8 of the carbon dioxide.

The method may also further comprise: passing the syngas through a filter system to remove ash; and cleaning tars produced from the syngas using a wash system.

In some embodiments, the unprocessed biomass is: first converted into RNG; and shipped to a site to be converted to hydrogen.

The method may also comprise a step of delivering the hydrogen to hydrogen-powered vehicles.

The method may further comprise delivering the hydrogen to hydrogen-powered vehicles adapted to deliver unprocessed biomass into storage and/or delivering the hydrogen to hydrogen-powered vehicles adapted to deliver hydrogen into storage.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a flow chart of a method of reducing carbon with a direct coupled atmospheric device with hydrogen utilization in accordance with the present invention;

FIG. 6 is a flow chart of a method of reducing carbon with a direct coupled atmospheric device with hydrogen utilization in accordance with the present invention;

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
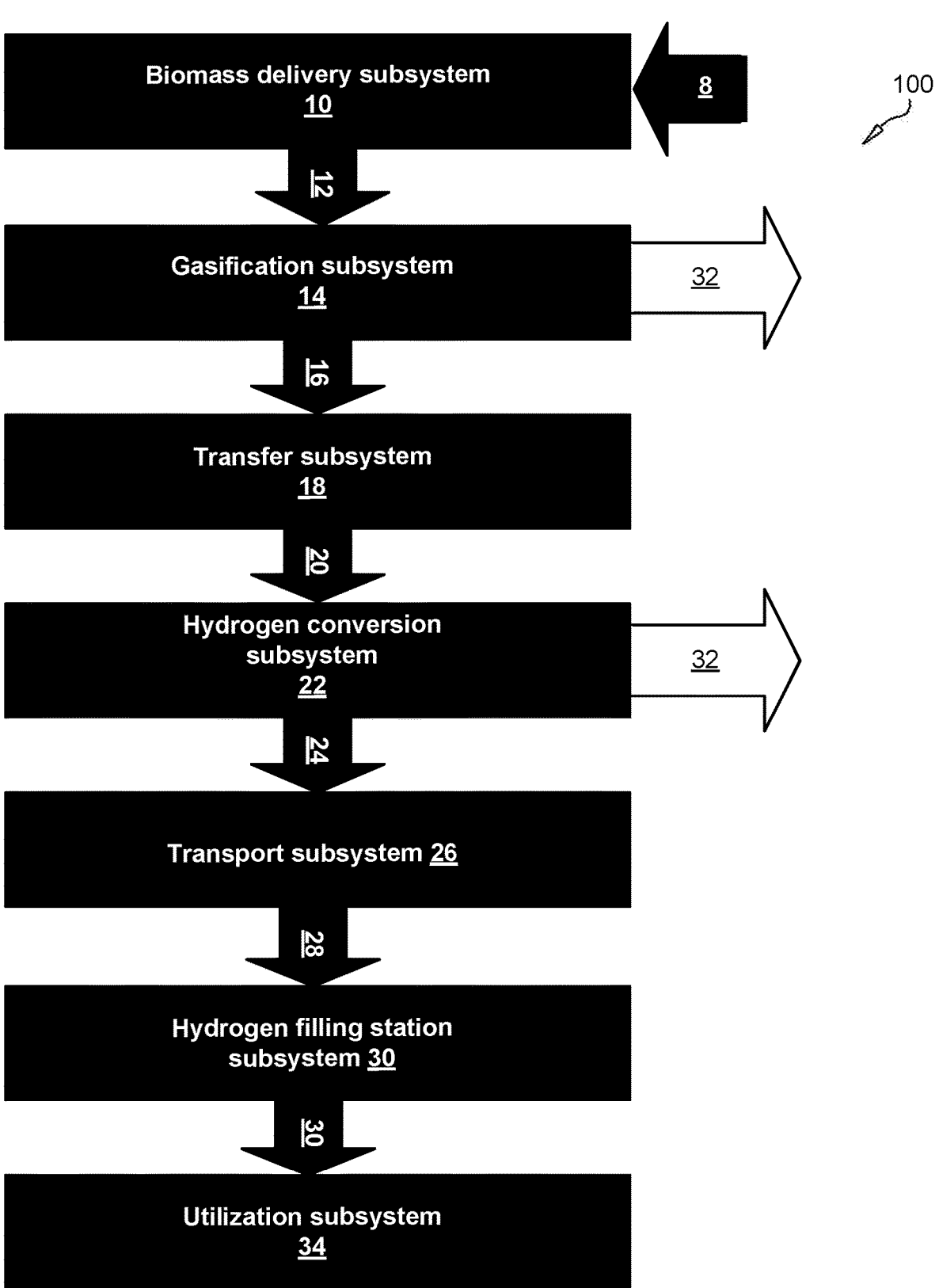
FIG. 1 illustrates a direct coupled atmospheric carbon reduction device with hydrogen utilization in accordance with the present invention.

FIG. 1 illustrates a direct coupled atmospheric carbon reduction device with hydrogen utilization 100 in accordance with the present invention.

The system 100 comprises a biomass delivery subsystem 10, a gasification of biomass process subsystem 14, a transfer subsystem 18 adapted to transfer syngas or methane to the hydrogen conversion point; a hydrogen conversion subsystem 20 adapted to deliver to hydrogen buffer storage 204, a transport subsystem 26 adapted to deliver hydrogen to the utilization site, a hydrogen filling station subsystem 30, and utilization subsystem 34.

Biomass 8 is delivered 12 to the gasification subsystem 14. Syngas or methane is transferred 16 to the hydrogen conversion point. The transfer subsystem 18 is adapted to route 20 methane and/or hydrogen to or the hydrogen conversion subsystem 22.

The hydrogen conversion subsystem 22 routes the hydrogen to either the hydrogen buffer storage 204 or to utilization site.

$CO_2$ 32 is offtaken from gasification subsystem 14 and hydrogen conversion subsystem 22.

Figure 2:
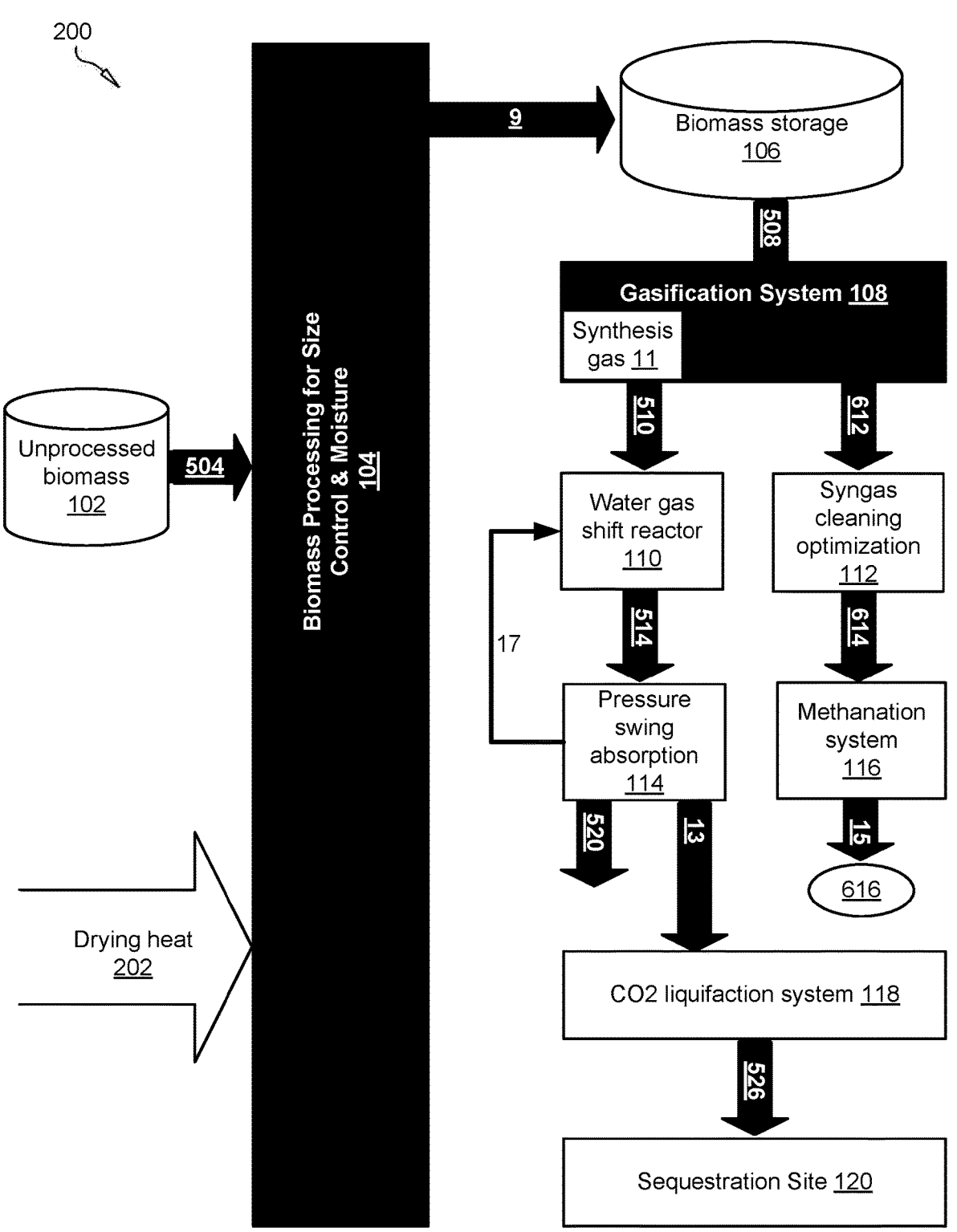
FIG. 2 illustrates a direct coupled atmospheric carbon reduction device with hydrogen utilization in accordance with the present invention.
Figure 3:
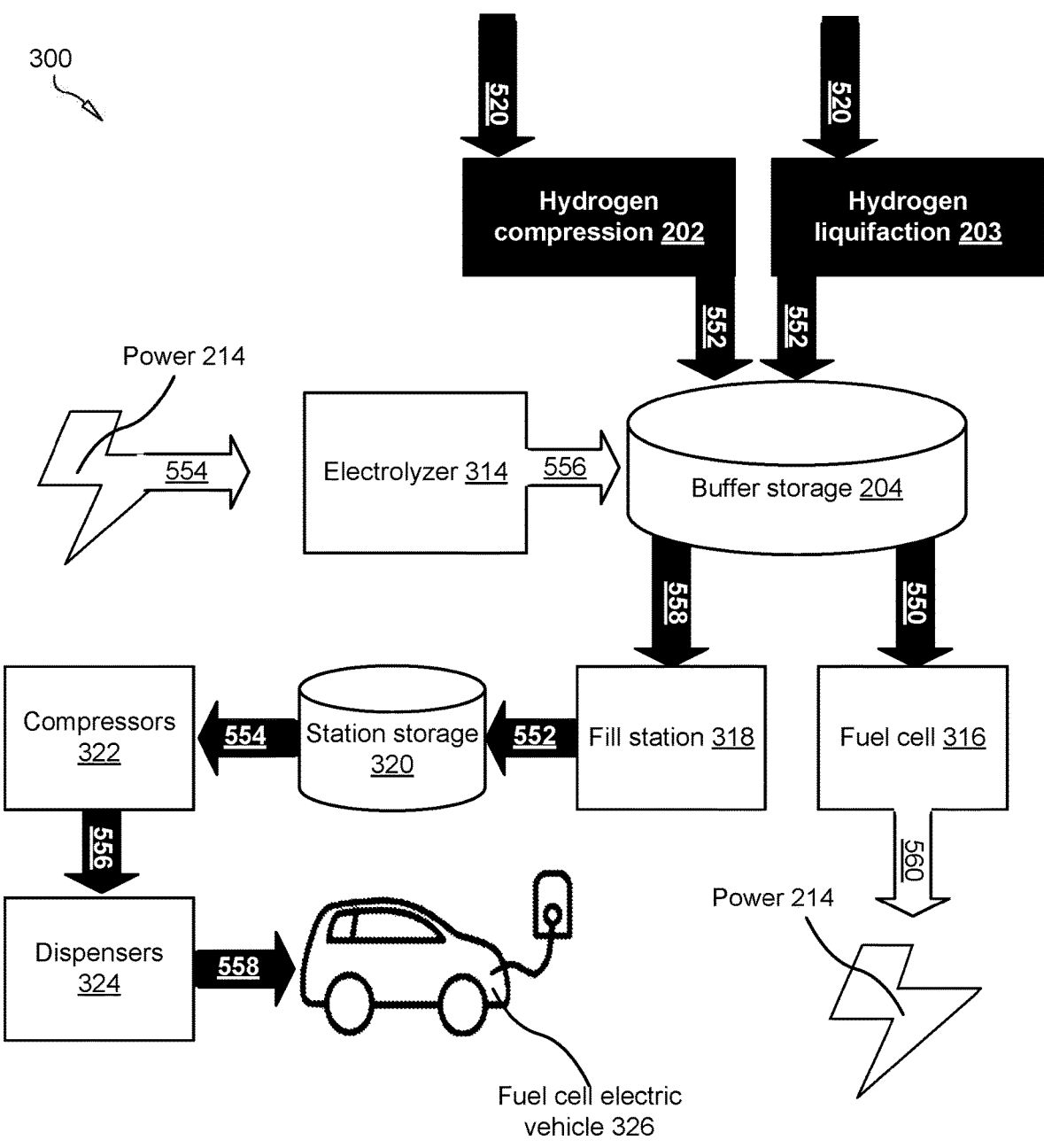
FIG. 3 illustrates a direct coupled atmospheric carbon reduction device with hydrogen utilization in accordance with the present invention.
Figure 4:
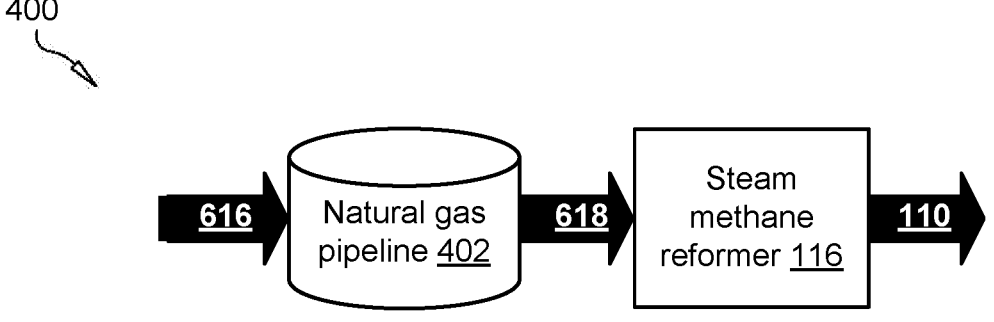
FIG. 4 illustrates a direct coupled atmospheric carbon reduction device with hydrogen utilization in accordance with the present invention.
Figure 7:
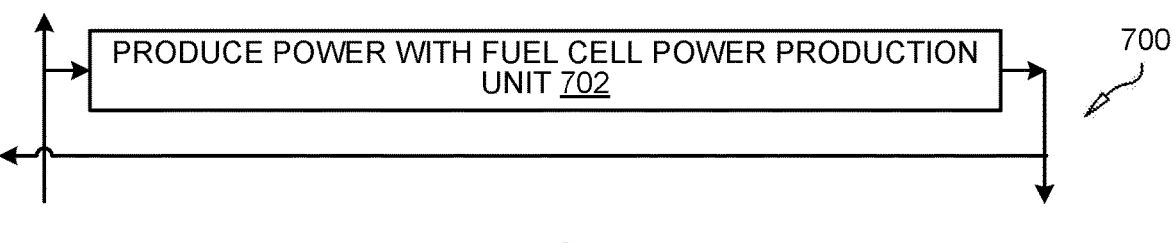
FIG. 7 is a flow chart of a method of reducing carbon with a direct coupled atmospheric device with hydrogen utilization in accordance with the present invention.
Figure 8:
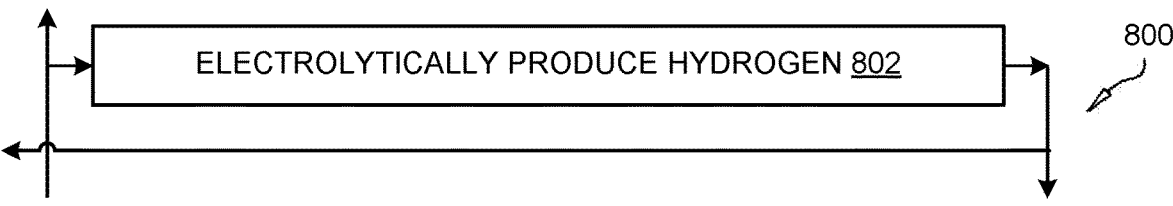
FIG. 8 is a flow chart of a method of reducing carbon with a direct coupled atmospheric device with hydrogen utilization in accordance with the present invention.
Figure 9:
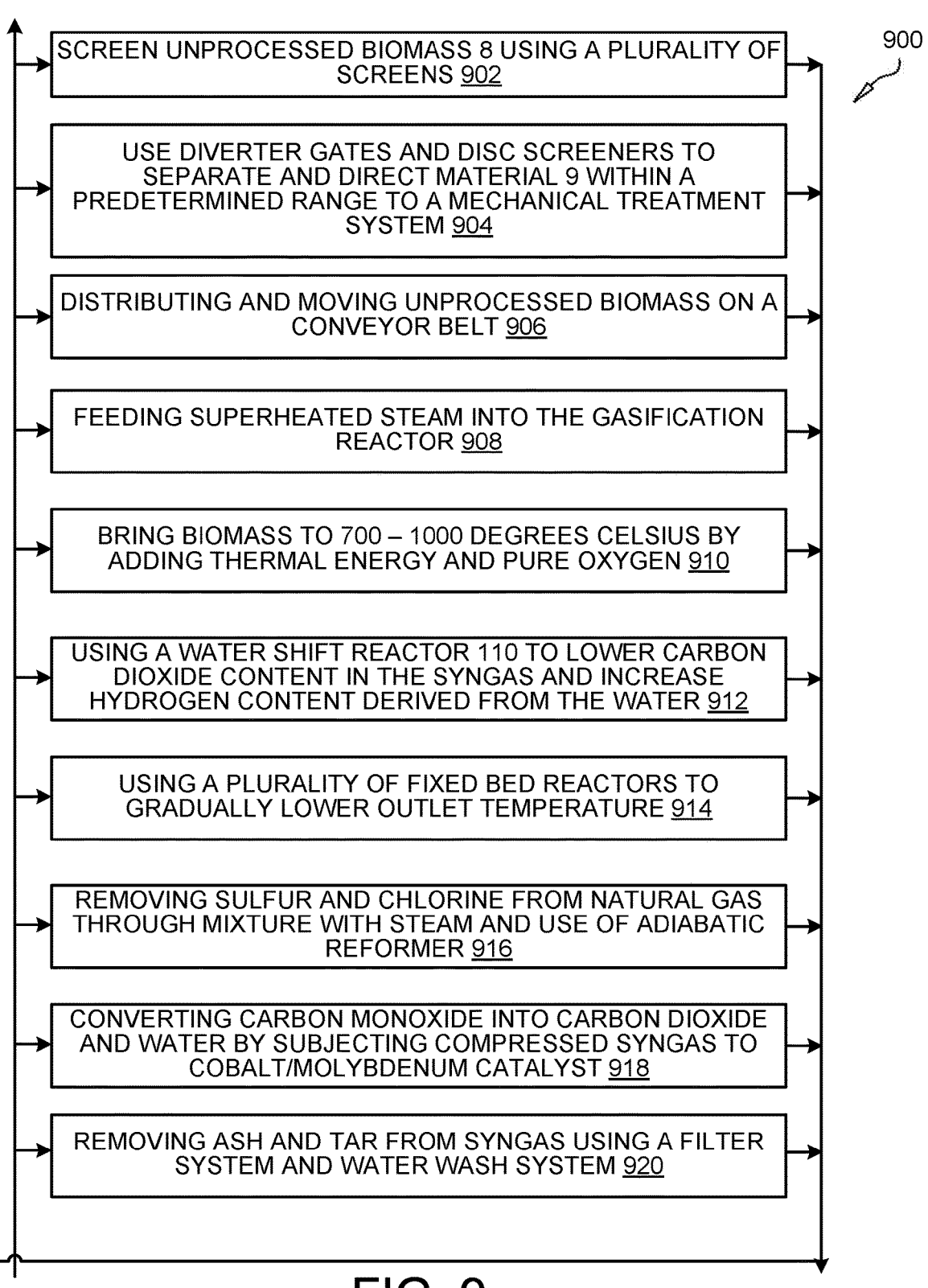
FIG. 9 is a flow chart in accordance with the present invention.

FIGS. 2-4 illustrate a direct coupled atmospheric carbon reduction device with hydrogen utilization 200, 300, 400 in accordance with the present invention.

As shown in system 200, the biomass 8 to be processed in the system 200 is aggregated to a central point 102. Biomass receiving and stockout systems include an area where delivery trucks or barges convey biomass by tipper-type dumpers or by dumping directly into a receipt bin system. Then material from the receipt piles are fed to a conveyor system. The biomass 8 is transferred 504 to a biomass processing system 104 adapted to filter the biomass 8 by size and to measure moisture. Biomass is processed with standard mechanical treatment processes to increase the accessible surface area of the feedstock. Mechanical processing will involve the use of machinery with cutting, chopping or grinding systems for feedstock. Then the material is sent to be screened 902 such that a properly-sized material for input to the gasification system is obtained. A series of diverter gates and disc screeners are used 904 to separate the material to be directed to the appropriate mechanical treatment systems for the received material starting size.

Biomass 8 which falls above or below a predetermined threshold is transferred 506 to biomass storage 106. This threshold may be between 2 mm and 80 mm in average diameter.

Once converted by mechanical means to the appropriate size then the material is sent to a circular or radial stacker for buffer storage material holding. The size requirements for this system is for material to be between 2 mm and 80 mm with a preferred size of the sum of length, height and width less than 100 mm and with 95% of the material above 2 mm in diameter.

The system 104 is adapted to measure moisture content of the input biomass 8 and reduce moisture to a design point preparatory for processing the biomass 8 in the gasification system 108. The processed biomass 9 is then moved to the biomass storage system 106. Input material as received should have a moisture content of 30% to 45% by weight and the preferred moisture content is 30% for as received material.

The processed biomass 9 is moved 508 from the biomass storage 106 to drying system to reduce the moisture content for the gasification system input of 17% moisture by weight or such moisture content that the specific gasification technology provider specifies. Such moisture reduction system may be a conveyer based moving bed dryer using waste heat recovered from the process. The biomass is then fed from a lock hopper system with feed lines to a gasification system 108. Biomass and a bed material are mixed and fed through a biomass metering screw conveyance system where the biomass 9 is processed in the gasification system into a synthesis gas 11. The input materials and super-heated steam are fed into the gasification reactor and are brought to high temperatures by either internal reaction thermal energy with pure oxygen being added or from thermal energy supplied indirectly from an external source. The reaction temperatures vary between reactor designs but generally fall between 600 C and 1000 C depending on target products of syngas 11 for the following process. The syngas 11 is made up of various hydrocarbons comprising predominantly carbon monoxide and hydrogen. This syngas 11 is cleaned by cooling and passing the gas 11 through a filter system to remove unconverted material or ash and then is further cleaned by a tar removal process (or tar removal system 1118). In an indirect gasification system 108, the unconverted carbon and tar is sent to the indirect combustion system to create thermal energy for the gasification drying 906, steaming, and moisture reduction processes. This synthesis gas 11 is either then directed into a system 110 to directly produce hydrogen from the synthesis gas 11 or it is directed into a system 112 to create an intermediate gas product methane.

If the synthesis gas 11 will be converted to hydrogen, the synthesis gas 11 is directed to a water gas shift reactor 110 where the hydrocarbon elements in the synthesis gas 11 are converted to a higher percentage of hydrogen. This reaction lowers the carbon monoxide content in the syngas and increases the hydrogen content by utilizing hydrogen in water or H2O. The process uses one or more fixed bed reactors in 2-3 stages at gradually lower outlet temperatures. FE-CR based catalysts are used in the reaction. Gas inlet temperatures operate between 350 degrees C. and 550 degrees C. That gas is then directed 514 to a pressure swing adsorption (PSA) system 114 where hydrogen is separated from the synthesis gas 11 to provide a concentrated hydrogen stream 13. The PSA process is based on the physical binding property of the gases to a solid adsorbent material remaining in the syngas. The PSA process is a process for separating gas components and is widely used in commercial applications. The feed gas is fed into the adsorber vessels. The vessels are regenerated by lowering the pressure and flushing with a high-pressure product. The low-pressure product containing the contaminant stream is fed back to the water gas system. The tail gas from the PSA is directed back to the water gas shift reactor 110 to continue making hydrogen rich gas and will be cycled through the PSA system.

If the synthesis gas 11 is to be converted to methane, the synthesis gas 11 is first directed 612 to a synthesis gas cleaning and tar removal optimization system 112 to prepare the synthesis gas 11 to be sent to a methanation system 116. Compressed syngas is sent to a reactor system where CO (carbon monoxide) is converted into $CO_2$ and $H_2O$ in the presence of steam over a Cobalt/Molybdenum catalyst. After that shift reactor process $H_2S$ is removed in an acid gas removal unit. $H_2S$ must be removed because it can deactivate the catalyst the methanation catalyst. The CO, $CO_2$ and $H_2$ gases are converted into $CH_4$ in a two-pass methanation reactor. The product leaving the methanation reactor is directed to a molecular sieve and silica gel bed prior to the pipeline system and compressor required to inject the methane into the natural gas pipeline infrastructure 115 that produces a methane rich stream 15 that is suitable to be injected into a natural gas pipeline system 402. The tail gas stream will contain $CO_2$ and that $CO_2$ can be separated out by means of an amine stripping system. $CO_2$ rich gas is fed to an adsorber where the $CO_2$ gas in the stream reacts with amine. The rich amine solution that is loaded with $CO_2$ is sent to a stripper system to desorb the $CO_2$ with heat applied and the $CO_2$ is released and captured into a collection system. Desorbed amine leaves the system and is cooled and sent back to the adsorber to cycle. Amine systems should be able to scrub the $CO_2$ stream with up to 40% $CO_2$ with up to 99.8% removal of the $CO_2$.

That methane rich stream 15 is then moved physically, or by book and claim transport accounting, to a point where it is removed from a natural gas pipeline 402. Natural gas from the interstate pipeline system is treated to remove and sulfur and chlorine in the feed gas. The clean gas is mixed with process steam and is sent to an adiabatic reformer to convert light hydrocarbons in the natural gas (C2+) before being sent to the primary reformer. That gas is then directed 618 into a steam methane reformer system 116. The syngas produced from the natural gas will then contain $CO_2$, CO, $H_2$ and residual $CH_4$. The syngas that is converted from the natural gas to a synthesis gas 11 is taken into a high temperature water gas shift reactor where CO is and input $H_2O$ is converted to $H_2$ with a residual of 2.5% to 3% CO by volume 110 to produce a hydrogen rich gas (12). That gas is taken to a pressure swing absorption system 114 to provide a concentrated hydrogen stream 13 (i.e., "hydrogen gas"). The PSA unit will separate out 85% to 90% of the $H_2$ with a purity of 99.9% that is recovered. The tail gas 17 from the PSA may be directed back to the water gas shift reactor 110 to continue making hydrogen rich gas. $CO_2$ can be separated out from the PSA tail gas that has been stripped of the hydrogen by means of an amine stripping system. $CO_2$ rich gas is fed to an adsorber where the $CO_2$ gas in the stream reacts with amine. The rich amine solution that is loaded with $CO_2$ is sent to a stripper system to desorb the $CO_2$ with heat applied and the $CO_2$ is released and captured into a collection system. Desorbed amine leaves the system and is cooled and sent back to the adsorber to cycle. Amine systems should be able to scrub the $CO_2$ stream with up to 40% $CO_2$ with up to 99.8% removal of the $CO_2$.

The hydrogen gas 13 is taken to a hydrogen compression system 202 or a hydrogen liquification system 203 depending on transport need. That hydrogen 13 is then directed 522 into a buffer storage facility 204. The system 202, 203 include a mechanism to balance hydrogen production. If additional hydrogen 13 is needed for the usage systems in this invention, then power 214 will be used to electrolytically produce 556 hydrogen in an electrolyzer 314. If there is a surplus of hydrogen in the buffer 204, then hydrogen will be directed to a fuel cell power production unit 318 to produce power 214. Hydrogen will be directed 558 to the hydrogen transport filling system 318 from the buffer storage 204 as needed.

The hydrogen may be directed into the hydrogen transport system 318. The subsystems shown in FIGS. 2-4 collectively form a pipeline transport system for pure hydrogen, or alternatively a trucking or railroad-based transport system in specialized holding containers for the trucks or rail cars.

The hydrogen fuel is transported 552 to a hydrogen filling stating storage system 320. The hydrogen filling station system 320 transfers the hydrogen through a series of compressors 322 that deliver the hydrogen fuel through dispensers 324 for input to the hydrogen fueled vehicles 326.

FIGS. 5-9 are flow charts of a method of reducing carbon with a direct coupled atmospheric device with hydrogen utilization in accordance with the present invention.

Figure 10A:
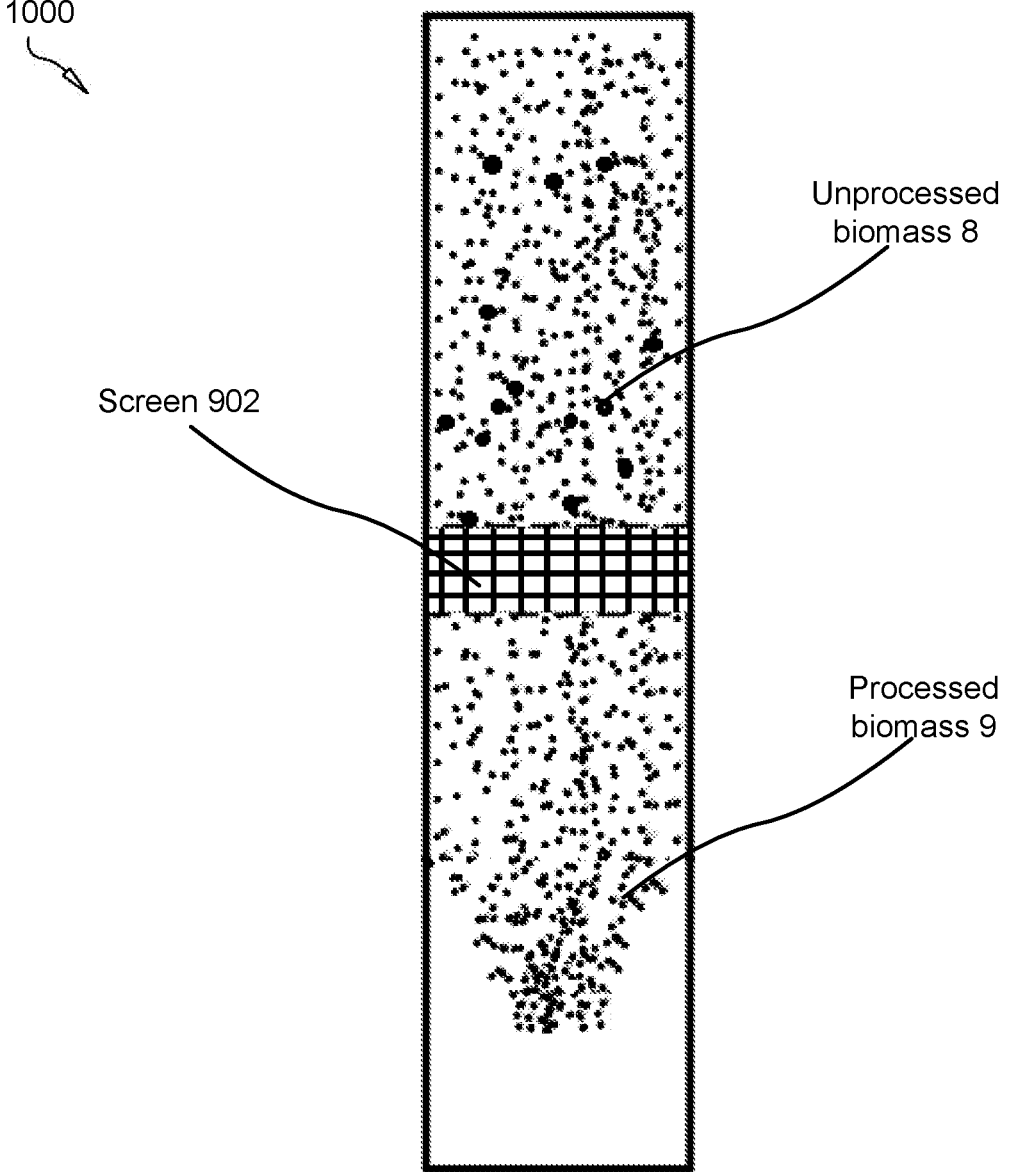
FIG. 10A illustrates a screen for filtering biomass in accordance with the present invention.
Figure 10B:
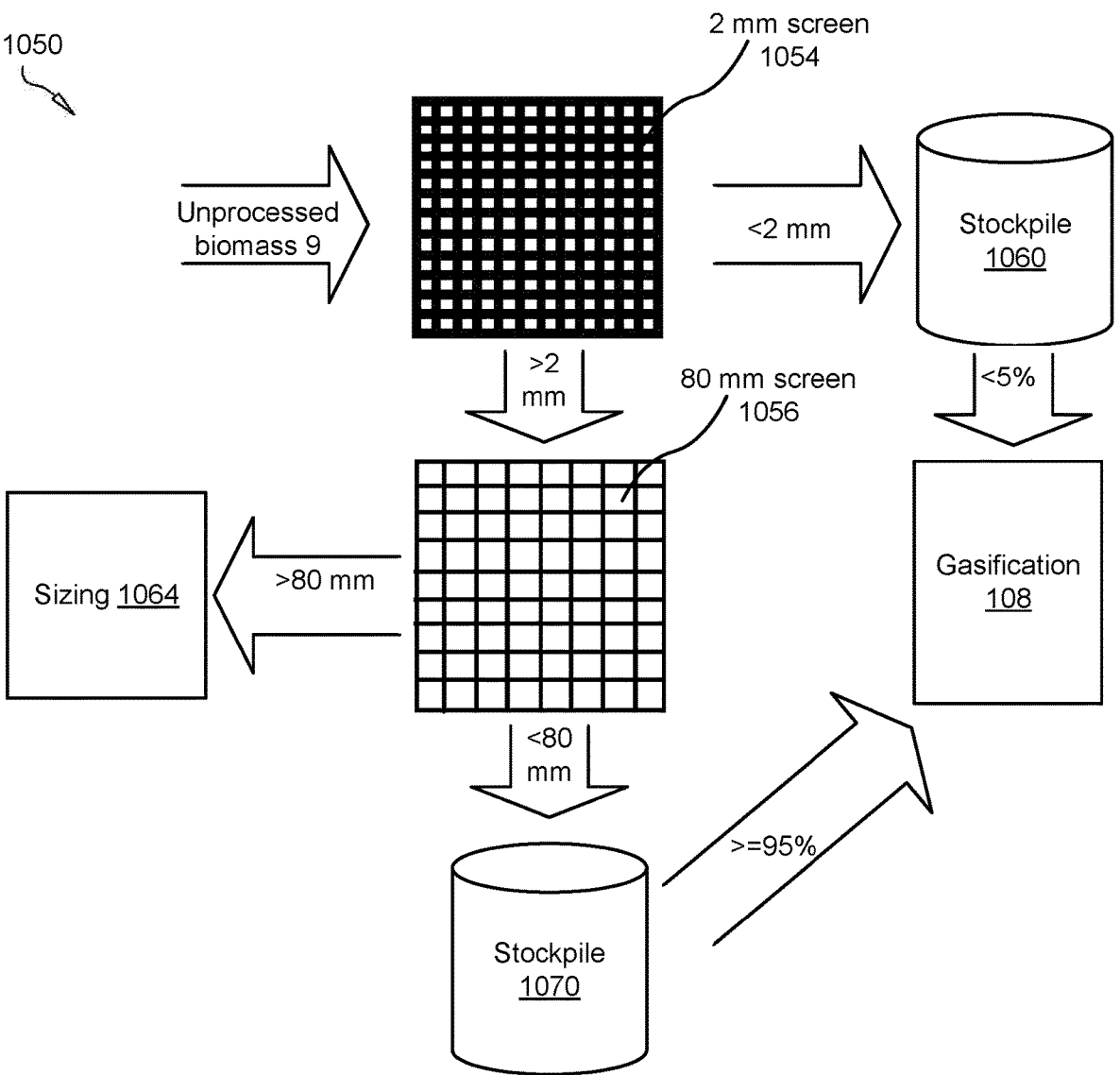
FIG. 10B illustrates a screen for filtering biomass in accordance with the present invention.

FIGS. 10A-10B illustrates a screen for filtering biomass in accordance with the present invention. Unprocessed biomass is sent to an initial screening system 902 to remove any items such as metal or other unwanted materials.

As shown, the unprocessed biomass 8 is filtered for diameter with a screen 902. In various embodiments, unprocessed biomass 9 is filtered through a 2 mm screen 1054. Particulate of the unprocessed biomass 9 which is less than 2 mm and which passes through the filter is diverted to the 2 mm stockpile 1060. Particulate exceeding 2 mm is directed to an 80 mm screen 1056. Biomass particulate (or material) exceeding 80 mm substantially in width is returned to a sizing system 1064. Particulate passing through the screen 1056 is sent to an 80 mm stockpile 1070.

A mixture of less than 5% of the particulate in the 2 mm stockpile 1060 is sent to a gasification system 108. Approximately 95% of material in the stockpile 1070 is combined with the material from the stockpile 1060 and the combined biomass is sent to gasification 108.

The 2 mm screen 1054 may be between 1.5 mm and 2.4 mm and the 80 mm screen 1056 may between 75 mm and 84 mm.

Figure 11:
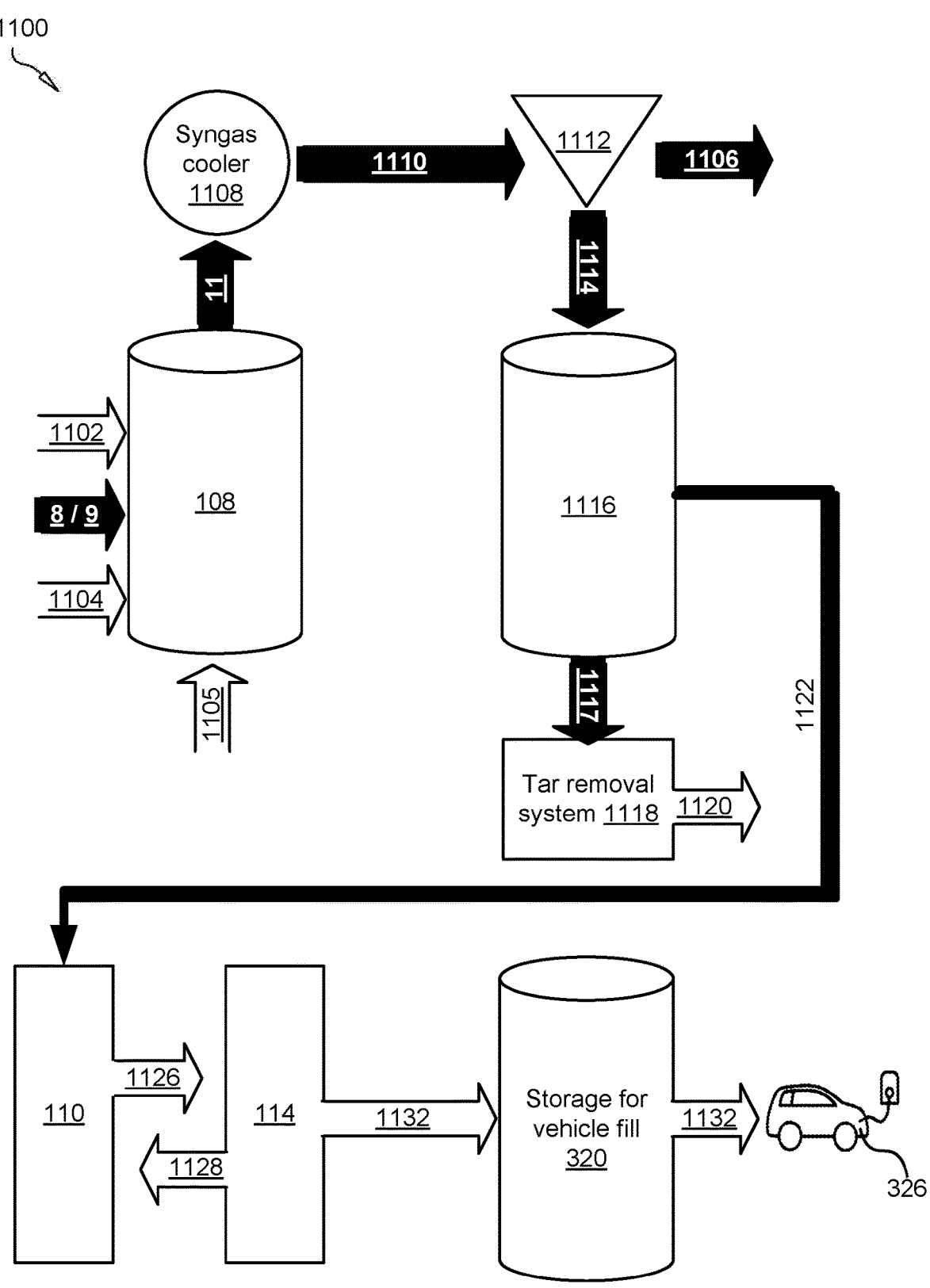
FIG. 11 illustrates a system and method for gasification to hydrogen in accordance with the present invention.

FIG. 11 illustrates a system and method 1100 for gasification to hydrogen in accordance with the present invention.

Steam 1102 and unprocessed biomass 8 (or alternatively, filtered biomass 9 or otherwise processed biomass disclosed above) is input into a gasification system 108 along with one of ambient air 1104 or oxygen ($O_2$ 1105). Syngas 11 is directed to a syngas cooler 1108. The cooled syngas 1110 is then directed to a gas filter system 1112. Ash and fly coke 1106 are filtered from the system 1112 and diverted to various commercial systems, while the remainder is directed to storage 1116. In some embodiments, the gas is directed in part to a tar removal system 1118 and the tar is sent at 1120 to a combustion system to be used for energy. The syngas portion cleansed of tar may be sent to various commercial system 1122 known to those of skill in the art.

From storage 1116, a water shift reactor 110 is used to upgrade and increase hydrogen content in the input gas 1114 which gas 1126 is then sent to a pressure swing adsorption system (PSA) 114 adapted to concentrate the hydrogen. Tail gases 1128 from the PSA 114 are sent back to the water shift reactor 110. Hydrogen output from the PSA 114 is sent to storage 320 for use, in some embodiments, with fueling hydrogen vehicle 326.

Figure 12:
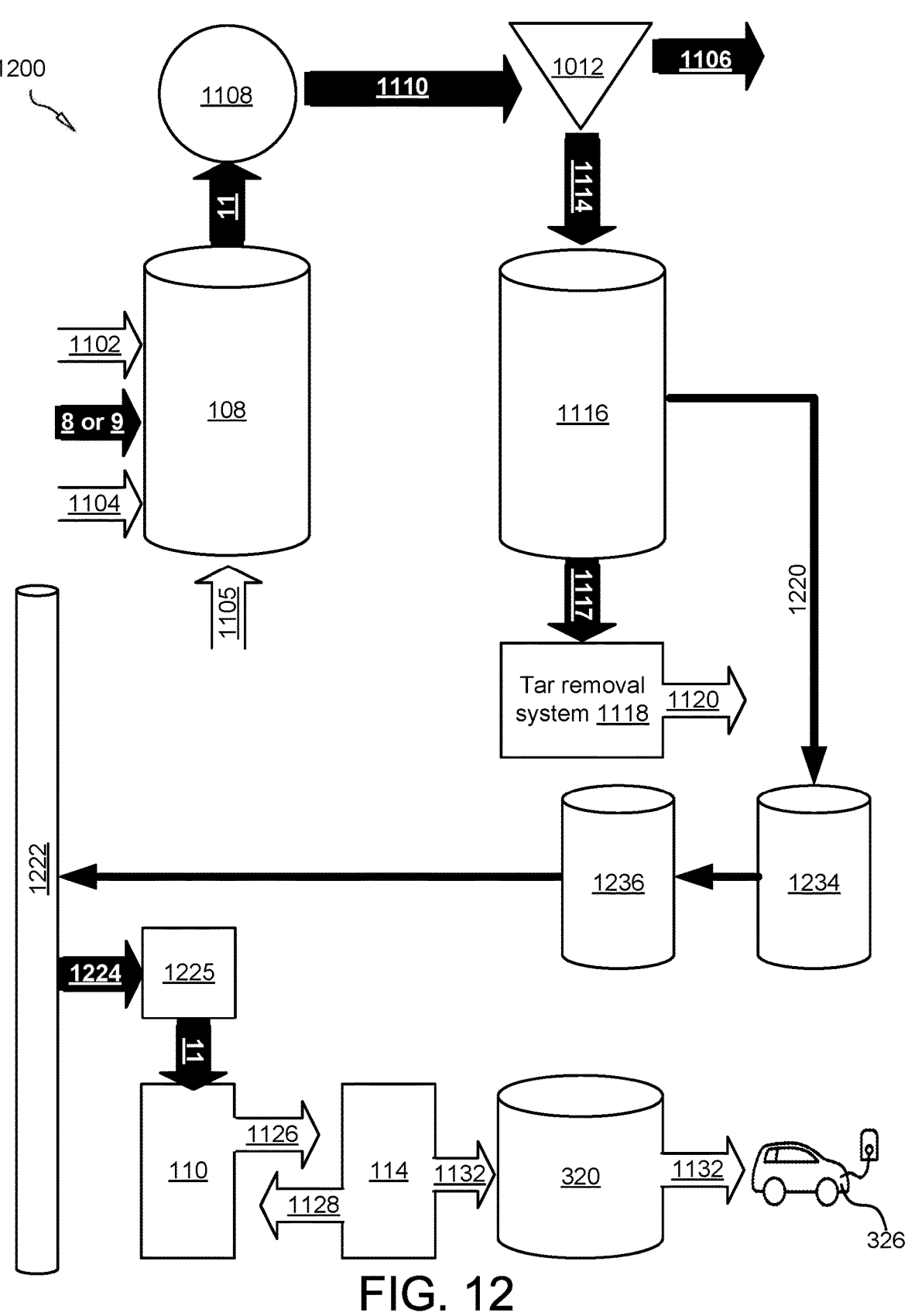
FIG. 12 illustrates a system and method for gasification to methane for book and claim transfer to a hydrogen production site in accordance with the present invention.

FIG. 12 illustrates a system 1200 and method for gasification to methane for book and claim transfer to a hydrogen production site in accordance with the present invention.

Gas is upgraded 1234 to match the methanation system hydrogen and CO balance required by the methanation system 1236. In various embodiments, methane 1220 is output from a methanation system 1236 to an interstate pipeline 1222 which carries the methane 1222 to a remote location by book and claim transfer. At the remote transfer location, the methane 1224 (in the form of natural gas) is input into a steam methane reformer 1225. Syngas 11 from the steam methane reformer 1225 is sent to a water shift reactor 110 used to upgrade and increase hydrogen content in the input gas 11 which gas 1126 is then sent to a pressure swing adsorption system (PSA) 114 adapted to concentrate the hydrogen. Tail gases 1128 from the PSA 114 are sent back to the water shift reactor 110. Hydrogen output from the PSA 114 is sent to storage 320 for use, in some embodiments, with fueling hydrogen vehicle 326.

Figure 13:
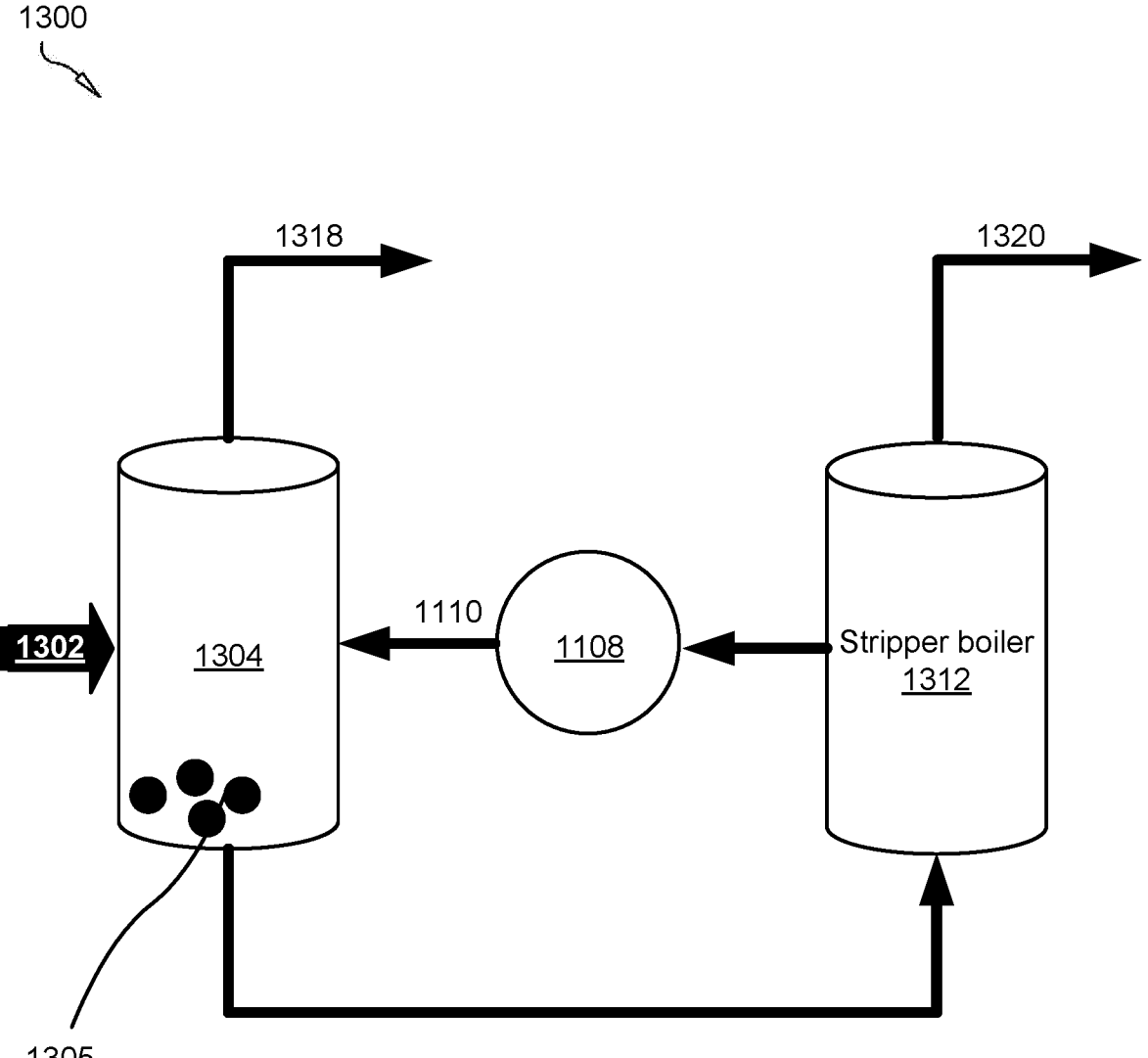
FIG. 13 illustrates a system and method for amine carbon dioxide scrubbing in accordance with the present invention.

FIG. 13 illustrates a system and method for amine carbon dioxide scrubbing in accordance with the present invention.

In various embodiments, $CO_2$ is input into a vessel 1304 containing $CO_2$ absorbing material 1305 as known to those of skill in the art. Lean gases 1318, containing low $CO_2$, are output from the vessel 1304, while gas 1110 from a syngas cooler 1108 are input. $CO_2$ bound to amine material is sent to a stripper boiler 1312 where heat is applied and $CO_2$ gas is collected at 1320. The amine material is then sent to a cooler 1108 to be delivered back into the vessel 1304 at the transfer 1110 input to the amine cycle $CO_2$ removal system.

Gases from a stripper boiler 1312, which output CO₂ syngas 1320 to divert CO₂ to a storage system.

Figure 14:
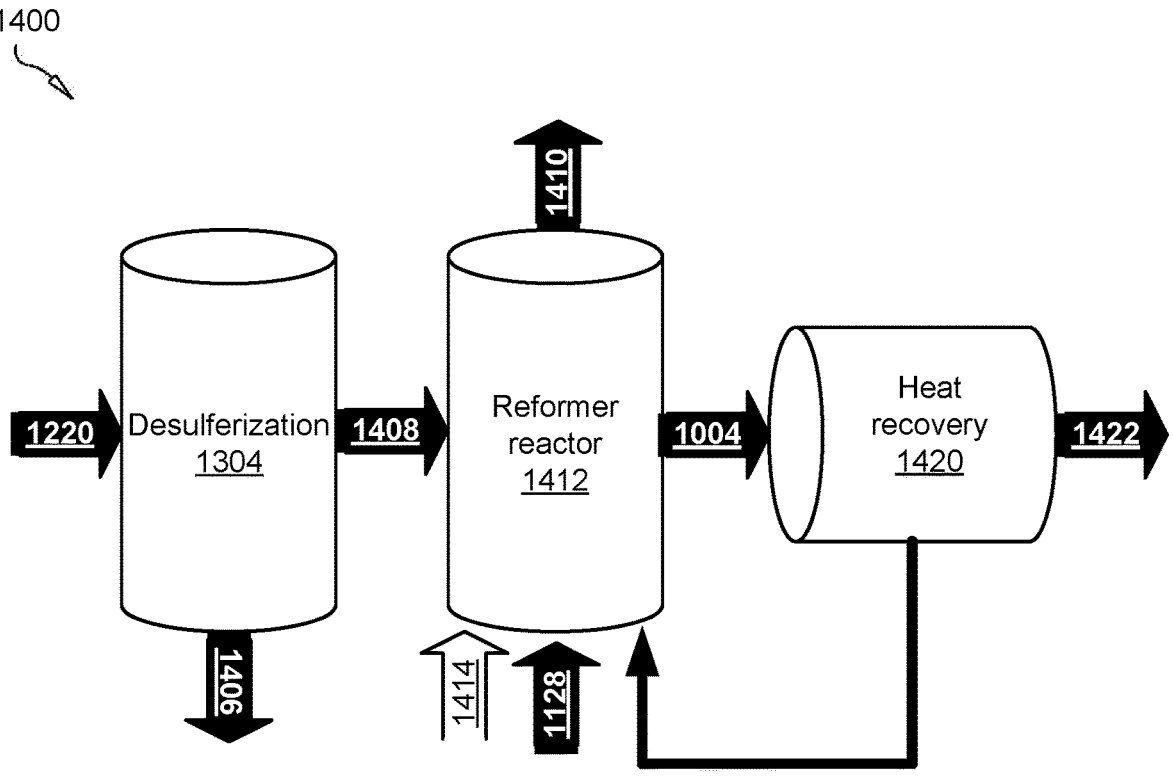
FIG. 14 illustrates a system and method for steam reforming in accordance with the present invention.

FIG. 14 illustrates a system and method for steam reforming in accordance with the present invention.

In some embodiments, gas 1220 from an interstate pipeline is input into a desulfurization system 1304, wherein sulfur 1406 is diverted therefrom and the remaining methane 1408 (CH₄) sent to a reformer reactor 1412.

Steam 1102 from a heat recovery system 1420 is input into the reformer reactor 1412 along with fuel 1414 and tail gas 1128. Gases 1422 from the heat recovery system 1420 are diverted to a water gas shift reactor 110.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of converting biomass into hydrogen, the steps of the method comprising:
   creating processed biomass from unprocessed biomass aggregated to a central point having a moisture content of 30% to 45% by weight by:
      adding drying heat to a system configured to reduce moisture of unprocessed biomass to 17% by weight;
      filtering out particulates from the unprocessed biomass which exceed a predetermined diameter threshold using one or more of: a screen, diverter gate, and disc screener;
   depositing the processed biomass in storage using a lock hopper system and feed lines;
   submitting the processed biomass, pure oxygen, and super-heated steam to a gasification process to create a syngas using internal reaction thermal energy, wherein the syngas comprises predominantly carbon monoxide and hydrogen, in which:
      a portion of the processed biomass is converted to carbon dioxide that is captured and sequestered in a storage tank; and the hydrogen is produced and captured;
   wherein the syngas is between 600 and 1,000 degrees Celsius;
   gradually lowering a temperature of the syngas using three fixed bed reactors to increase hydrogen content.

2. The method of converting biomass into hydrogen of claim 1, wherein the processed biomass is between 2 mm and 80 mm in diameter.

3. The method of converting biomass into hydrogen of claim 1, further comprising moving the unprocessed biomass on a moving conveyor belt during the addition of drying heat.

4. The method of converting biomass into hydrogen of claim 1, further comprising subjecting the processed biomass during the gasification process to the hydrogen a reaction step involving iron and chromium-based catalysts.

5. The method of converting biomass into hydrogen of claim 1, wherein an inlet temperature of the syngas to a water gas shift reactor is between 350 degrees and 550 degrees Celsius.

6. The method of converting biomass into hydrogen of claim 1, further comprising as intended use:
   submitting compressed syngas to a reactor system in which carbon monoxide is converted into carbon dioxide and water in the presence of steam over a cobalt-molybdenum catalyst;
   removing H₂S and CO₂ using an acid gas removal unit;
   converting carbon monoxide, carbon dioxide and hydrogen into CH₄ using a two-pass methanation reactor.

7. The method of converting biomass into hydrogen of claim 1, further comprising:
   separating carbon dioxide from a tail gas stream using an amine stripping system; and
   feeding the carbon dioxide gas to an adsorber to react with amine to create a rich amine solution;
   sending the rich amine solution to a stripper system to desorb the carbon dioxide with heat;
   releasing and capturing the carbon dioxide into a collection system;
   cooling the desorbed amine and sending the desorbed amine back to adsorber to cycle.

8. The method of converting biomass into hydrogen of claim 7, wherein the amine stripping system removes the carbon dioxide.

9. The method of converting biomass into hydrogen of claim 1, further comprising:
   passing the syngas through a filter system to remove ash; and
   cleaning the syngas using a wash system and removing tar.

10. The method of converting biomass into hydrogen of claim 1, wherein the unprocessed biomass is:
   first converted into renewable natural gas (RNG); and
   shipped or transferred by book and claim methods to a site to be converted to the hydrogen.

11. The method of converting biomass into hydrogen of claim 1, further comprising as intended use of delivering the hydrogen to hydrogen-powered vehicles.

12. The method of converting biomass into hydrogen of claim 1, further comprising as intended use of delivering the hydrogen to hydrogen-powered vehicles.

13. The method of converting biomass into hydrogen of claim 1, further comprising delivering the hydrogen to hydrogen-powered vehicles adapted to deliver hydrogen into storage.

14. The method of converting biomass into hydrogen of claim 1, further comprising delivering the hydrogen to a plurality of hydrogen-powered vehicles adapted to deliver power to the electric grid as required.

15. The method of converting biomass into hydrogen of claim 1, further comprising:

cooling the syngas by passing the syngas through a filter system to remove one or more of ash and tar; and directing the syngas at 350 to 550 degrees Celsius to a water gas shift reactor incorporating fixed bed reactors.

16. The method of converting biomass into hydrogen of claim 15, further comprising separating hydrogen from the syngas using a pressure swing adsorption (PSA system.

\* \* \* \* \*